United States Patent Office 3,530,136
Patented Sept. 22, 1970

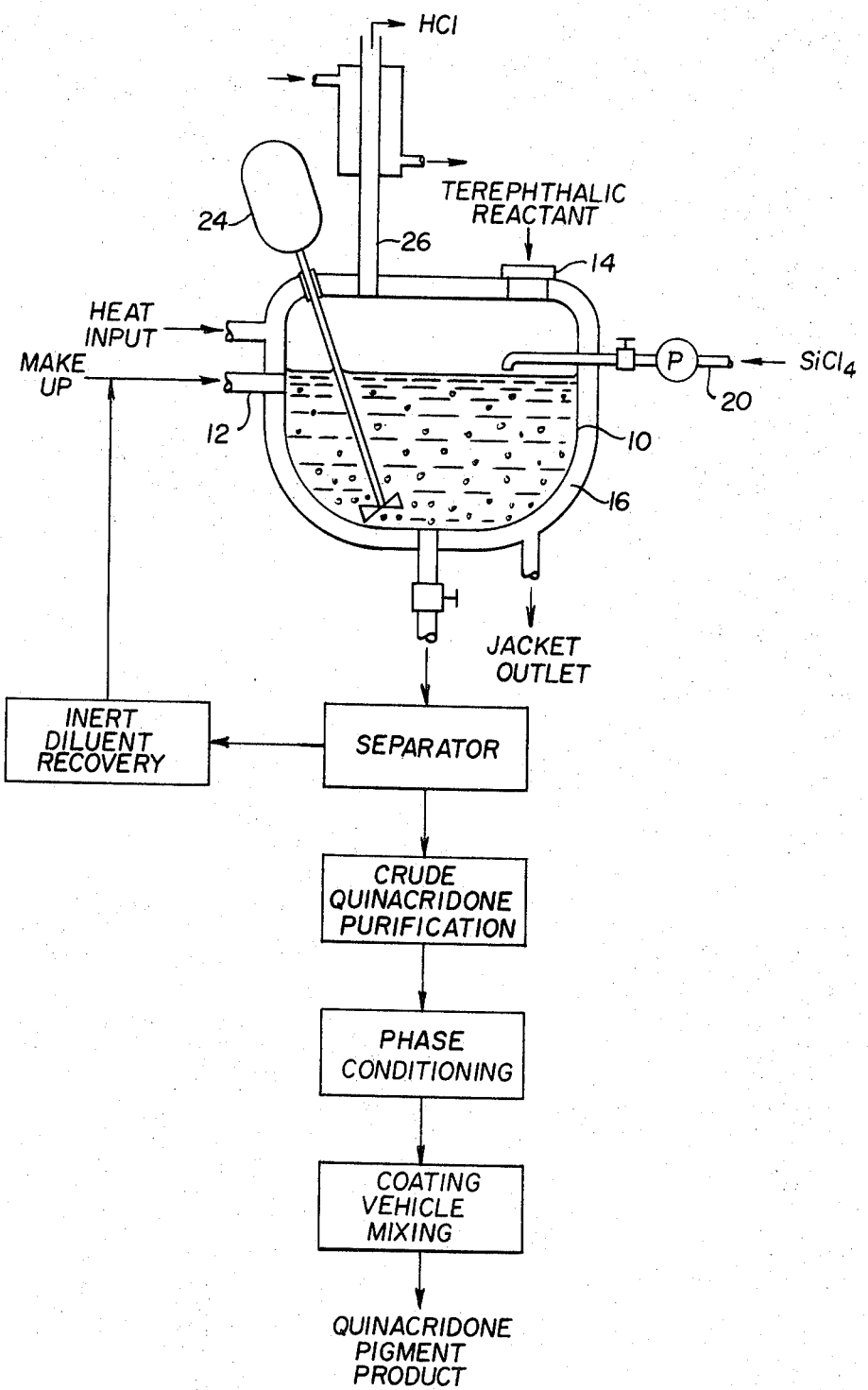

3,530,136
QUINACRIDONE SYNTHESIS FROM DIANILINO-TEREPHTHALIC ACID WITH SILICON TETRACHLORIDE
Kei C. Hsia and George J. Meisters, Chicago, Ill., assignors to The Sherwin-Williams Company, Cleveland, Ohio, a corporation of Ohio
Filed Jan. 11, 1968, Ser. No. 697,230
Int. Cl. C07d 39/00
U.S. Cl. 260—279                                    5 Claims

ABSTRACT OF THE DISCLOSURE

Quinacridones are synthesized by reacting diarylaminoterephthalic acid and derivatives with silicon tetrachloride in an inert diluent. By varying reaction temperature and mole ratio of silicon tetrachloride to terephthalic reactant, different crystal forms can be manufactured directly. The product is useful as a pigment.

DESCRIPTION

This invention relates to a new method for synthesizing quinacridone and its derivative compounds. A terephthalic reactant is selected from those compounds represented by the following structural formula:

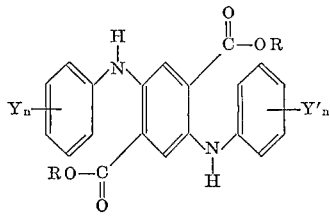

where R is H or lower alkyl; Y and Y' are halogen, lower alkyl, lower alkoxy, fused benzo or combinations of these, and $n$ is 0, 1 or 2 for either Y or Y'.

Ring closure of the terephthalic compound is effected with $SiCl_4$ in the presence of an inert diluent. The cyclodehydration or removal of alcohol from the phthalic reactant results in removing the —OR group from the two carboxyl linkages on the inner benzene ring and removing two hydrogens adjacent their respective amino groups on the two outer aryl rings. The formation of two heterocyclic rings between the aromatic rings provides the quinacridone structure, as follows:

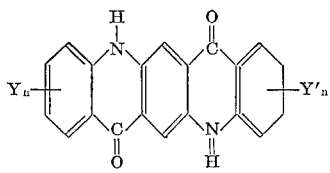

Theoretically, the ring closure reaction requires two moles of $SiCl_4$ for each mole of terephthalic reactant.

The 2,5-dianilinoterephthalic acid molecule can be substituted in the ortho, meta and para positions of both end rings. At least one ortho position must be unsubstituted, and up to two of the carbon atoms in the end rings of the three-ring dianilinoterephthalic reactant can be substituted with halogen, alkyl, alkoxy or other benzene rings fused to the anilino ring.

The condensation or ring-closure reaction produces about 80% yield after the reactants are heated for about 2 to 20 hours at 120 to 200° C. in an inert diluent such as nitrobenzene. The mole ratio of $SiCl_4$ to phthalic reactant is preferred to be between 2.4 and 4 to 1. Different crystalline forms of the quinacridones may be obtained by varying the reaction conditions, especially temperature.

Linear quinacridone is produced from 2,5-dianilinoterephthalic acid using the novel process of this invention. Conditioning the crude quinacridone by salt milling, etc., can be used to convert the several crystalline forms from one crystal phase to another.

PRIOR ART

The preparation of 2,5-dianilinoterephthalic acid and ring-closure with dry boric acid was disclosed by Liebermann et al. in Annalen 518, 245 (1935). The resulting linear quinacridone can also be prepared using other ring closing agents; $ZnCl_2$, $ClCOCl$, $PCl_5$, $AlCl_3$, $P_2O_5$, $TiCl_4$, and HBr, the reactants usually being suspended in a high-boiling inert organic liquid at elevated temperature.

The linear, angular, and iso-quinacridones have been reported by Cooper (U.S. Pat. 3,107,248) to be formed from diarylaminophthalic acids via cyclization with alkali metal hydrogen sulfate.

Ring-closure of the diarylaminoterephthalic acid compounds by heating in an inert diluent with benzoyl chloride and a pyridine base was reported by Streiff in U.S. Pats. 3,259,630 and 3,264,297.

Struve disclosed a process for synthesizing quinacridones from lower alkyl esters of 2,5-diarylamino-3,6-dihydro-terephthalic acid with subsequent oxidation of the ring-closure reaction product in U.S. Pat. 2,821,529.

The purified quinacridones are conditioned to produce various crystal forms for each compound. These processes include milling crude quinacridone with an inorganic salt. The milling step can be carried out in the presence of various modifiers and is discussed in detail in U.S. Pats. 2,844,484; 2,844,485; 2,844,581; 3,264,300; and 3,317,539.

The conditioned quinacridones are separated from the other materials present in the milling step. The products are excellent pigments having good resistance to fading, solvent resistance and high tinctorial power. When combined with a suitable organic coating vehicle, they can be used in inks, paints, etc.

THE DRAWING

The single figure of the drawing shows the process steps schematically and includes a cross-section view of a typical reactor. Inert diluent liquid and the arylaminoterephthalic reactant are charged to the reactor 10 through access ports 12 and 14. Reaction temperature is maintained by circulating a heat exchange medium in reactor jacket 16. Silicon tetrachloride is metered into reactor 10 through conduit 20, which introduces the liquid $SiCl_4$ dropwise into the heated diluent. The reaction solids are suspended in the inert diluent by agitation with a suitable stirrer 24. Vaporized $SiCl_4$ and HCl gas evolved during the reaction pass from the reactor 10 through overhead conduit 26. The $SiCl_4$ vapors are condensed by reflux cooler 28 and returned to the reactor. The reflux condenser 28 is maintained sufficiently cool to condense the $SiCl_4$ at about 58° C. HCl is withdrawn from the system and discarded or recovered. Normally, the reaction is carried out at ambient pressure because increased pressure decreases the product yield. Use of purging gas or inert atmosphere is not essential.

After the reaction is complete, product and diluent are separated by filtration. The inert diluent may be purified by distillation and recycled for reuse with make-up diluent. The crude quinacridone product is purified as later described, conditioned by salt milling and mixed with the desired coating vehicle to produce a pigmented product.

EXAMPLE I

Linear quinacridone is produced by using $SiCl_4$ as a ring-closure reagent. Into an agitated reactor 100 parts by weight of 2,5-dianilinoterephthalic acid is charged with nitrobenzene diluent. The ratio of diluent to terephthalic reactant is 5 cc./gm. This slurry is maintained at 120° C. while $SiCl_4$ is added dropwise to the mixture. The molar ratio of $SiCl_4$ to terephthalic reactant is 2.4:1 (20% stoichiometric excess). After a few minutes the refluxing ceases and the mixture is stirred at 120° C. for 20 hours. After slight cooling, the mixture is filtered and the crude quinacridone washed with hot nitrobenzene (100° C.) until washings are nearly colorless. The solid quinacridone is slurried with N-methylpyrrolidone (10 cc./gm. of terephthalic reactant) at 150° C. for 1 hour and filtered. The product is slurried with methanol (10 cc./gm.) for 30 minutes, filtered and washed with more methanol. The solids are then slurried in a 10% KOH solution in equal parts by volume of methanol and water at 60° C. for 1 hour, using an amount of solution equal to 10 cc./gm. of terephthalic reactant. The filtered solids are then slurried with 10 cc./gm. of hot water, filtered, and again washed with 100 cc./gm. of hot water. The solids are filtered and dried to constant weight at 125° C. The yield is 53.6 parts by weight of quinacridone (67.5% theoretical yield).

X-ray analysis of the unconditioned quinacridone shows that the product is gamma-phase linear quinacridone. A portion of the crude product is conditioned by milling with sodium chloride at 150° C. to give a good beta-phase violet pigment. Another portion of the crude is conditioned by milling with salt and dimethyl formamide at room temperature to give a good red alpha-phase pigment.

EXAMPLE II

The procedure of Example I is repeated except that the crude quinacridone is washed only in nitrobenzene and 5% aqueous NaOH (10 cc./gm.), hot water, and methanol. A 73.3% yield is obtained, but the material is less pure. X-ray analysis of the unconditioned quinacridone shows the material to be gamma-phase.

The effects of varying reaction time, reactant molar ratio, diluent concentration, and temperature were studied to determine conditions under which the synthesis is operable and to establish optimum reaction variables. These results are shown in Table I with the yields and phase analysis, where determined. The procedure of Example I is followed using 100 parts of dianilinoterephthalic acid reactant with 5 cc./gm. of nitrobenzene diluent, except where noted. The washing procedure of Example II was used in most runs. The amount of $SiCl_4$ added to the reaction mixture is expressed as a molar ratio to dianilinoterephthalic acid.

Reaction temperature above 110° C. up to the refluxing temperature of the diluent may be used. At lower temperatures (about 120° C.) the gamma-phase is predominant in the product. Intermediate temperatures (about 160° C.) favor the beta phase, and higher temperatures (about 200° C.) favor the alpha phase. Phase selectivity is an important advantage in pigment manufacture. Reactant ratio has a lesser effect on the product phase. A molar ratio of $SiCl_4$ to terephthalic reactant between about 2.4:1 and 3.2:1 is preferred.

TABLE I

| Run: | Reaction time, hours | Reaction temperature ° C. | Molar ratio | Yield, percent | Phase X-ray analysis |
|---|---|---|---|---|---|
| A | 20 | 90 | 2.4 | 0 | |
| B | 20 | 110 | 2.4 | 24.3 | |
| C | 20 | 120 | 2.0 | 56 | γ |
| D | 5 | 120 | 2.4 | 0 | |
| E | 20 | 120 | 1.6 | 43.6 | |
| F | 20 | 120 | 2.4 | 80 | |
| G | 20 | 140 | 2.4 | 78 | |
| H | 5 | (1)120 & 160 | 2.0 | 40.6 | |
| J | 5 | 160 | 2.0 | 76.3 | γ |
| K | 5 | 160 | 2.78 | (2)69 | α+β |
| L | 20 | 155 | 2.0 | 79.8 | α |
| M | 20 | 150-170 | 2.0 | 70.8 | α |
| N | 20 | 140-155 | 2.2 | 72.4 | α |
| O | 20 | 145-160 | 2.62 | 83.1 | α & β |
| P | 20 | 158 | 2.62 | 80.4 | α |
| Q | 20 | 140-155 | 4.0 | 67.4 | α & β & γ |
| R | 2 | 140-155 | 4.0 | 69.0 | |
| S[3] | 5 | 140-155 | 1.2 | 12.8 | |
| T | 5 | 140-155 | 2.4 | 74.0 | |
| U | 15 | 140-155 | 2.4 | 71.8 | |
| V | 20 | 140-155 | 2.4 | 78 | |
| W | 2.7 | [4]205 | 2.4 | 13.9 | |
| X | 5 | 200 | 2.4 | 47.2 | |
| Y | 20 | 200 | 1.6 | 43.5 | |
| Z | 20 | 200 | 2.0 | 62.5 | |
| AA | 20 | 200 | 2.4 | 80 | α+β |
| AB | 20 | 200 | 2.62 | 82.3 | β+γ |

[1] Two stage heat up.
[2] Ex. 1 wash.
[3] 10 cc. diluent/gm. acid.
[4] Reflux.

EXAMPLE III

The procedure of Example II is repeated except that 5 cc./gm. of trichlorobenzene is used as diluent. The reaction time is 20 hours at 140 to 155° C., and $SiCl_4$ molar ratio to dianilinoterephthalic acid is 2.4:1. The yield is 85.0%, but the quinacridone appears to be less pure.

In the following Examples IV to VIII the procedure of Example II is used, reacting different terephthalic compounds with a 20% excess of $SiCl_4$ at 150° C. in 5 cc./gm. of nitrobenzene.

EXAMPLE IV

Using 2,5-bis(o-chloroanilino)-terephthalic acid, a 23% yield of 4,11-dichloroquinacridone is obtained. This is an orange quinacridone compound having the following structural formula:

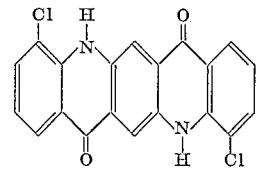

On the basis of X-ray diffraction analysis, alpha-phase 4,11-dichloroquinacridone was obtained.

Other halogenated quinacridones may be prepared from fluoro, bromo, or iodo-substituted terephthalic reactants.

EXAMPLE V

Using 2,5-bis(p-toluidino)terephthalic acid, a 69% yield of 2,9-dimethylquinacridone is obtained, having the structural formula:

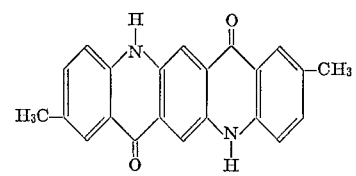

EXAMPLE VI

Using a fused benzo reactant, 2,5-bis(beta-naphthylamino)terephthalic acid, a 94% yield of 1,2,8,9-dibenzoquinacridone is obtained, having the structural formula:

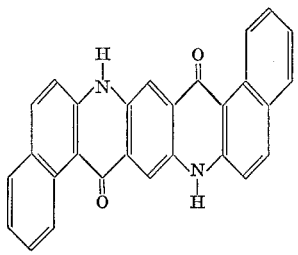

EXAMPLE VII

The ring-closure reaction also is effective with lower alkyl esters of terephthalic acid and derivatives. Using dimethyl 2,5-dianilinoterephthalate having the structural formula,

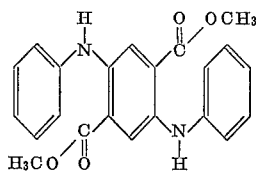

a 12% yield of linear quinacridone is obtained. (Procedure similar to Example I).

EXAMPLE VIII

Lower alkoxy substituents on the outside rings of the terephthalic reactant produce useful pigments. Using 2,5-bis(3-methoxyanilino) terephthalic acid, dimethoxyquinacridone was obtained in 61% yield, after 1.5 hours at 150° C. Since the outside rings are substituted in the meta position, a mixture of isomers with the $CH_3O-$ radical in the 3,10; 1,8; and 1,10 positions may be obtained. The structural formula for the dimethoxyquinacridones is:

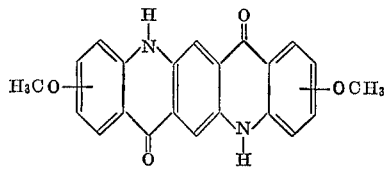

Adding $SiCl_4$ to the heated reaction mixture gives higher yields and more pure product than in the case where $SiCl_4$ is added at room temperature and the stirred mixture heated to the desired temperature.

Reaction temperatures for the new process are generally lower than for prior art syntheses.

The rate of stirring is not critical in this reaction. This is related to diluent-to-reactant proportions, and these variables should be adjusted to assure suspension of the solids during the reaction. Numerous inert liquids are known to the prior art workers for synthesis of quinacridones by similar ring-closure methods. High-boiling liquids, such as halobenzenes, biphenyl, mineral oil, alkyl phthalates, etc., have been used in the prior art for such diluents.

While the new synthesis process has been described with reference to specific examples, there is no intent to limit the inventive concept except as set forth in the following claims.

What is claimed is:

1. A process for preparing a quinacridone which comprises heating a 2,5-di(arylamino)terephthalic acid or ester reactant with silicon tetrachloride in an inert-liquid diluent.

2. The process of claim 1 wherein at least two moles of silicon tetrachloride is used per mole of terephthalic reactant and reaction temperature is maintained between about 120 and 200° C. for at least 2 hours.

3. The process of claim 1 wherein the terephthalic reactant consists essentially of 2,5-dianilino-terephthalic acid.

4. The process of claim 3 wherein 2.4 to 3.2 moles of silicon tetrachloride is used per mole of terephthalic reactant and the inert liquid diluent comprises nitrobenzene.

5. In the process wherein a phthalic reactant having the structural formula:

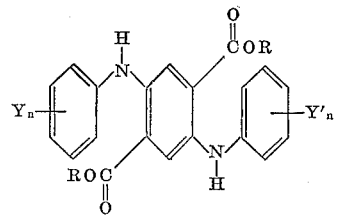

where R is hydrogen or lower alkyl, Y and Y' are halogen, lower alkyl, lower alkoxy, fused benzo or combinations of these, and $n$ is 0, 1 or 2;

is reacted with a ring closure agent while suspended in an inert liquid diluent to yield a quinacridone having the structural formula:

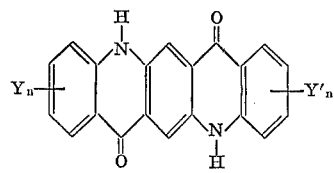

the improvement which comprises heating the phthalic reactant and a ring closure agent consisting essentially of silicon tetrachloride to a reaction temperature above 110° C. for sufficient time to obtain a substantial yield of the quinacridone.

References Cited

UNITED STATES PATENTS 3,020,279   2/1962   Woodlock _____ 260—279
3,256,285   6/1966   Fuchs _____ 260—279

DONALD G. DAUS, Primary Examiner

U.S. Cl. X.R.

106—288; 260—471, 518

UNITED STATES PATENT OFFICE
CERTIFICATE OF CORRECTION

PO-1050
(5/69)

Patent No. 3,530,136            Dated Sept. 22, 1970

Inventor(s) Kei C. Hsia et al.

It is certified that error appears in the above-identified patent and that said Letters Patent are hereby corrected as shown below:

Column 1, lines 50 to 57, the formula should appear as:

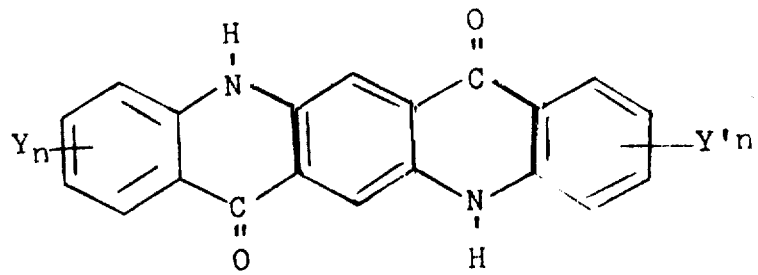

Signed and sealed this 13th day of April 1971.

(SEAL)
Attest:

EDWARD M. FLETCHER, JR.
Attesting Officer

WILLIAM E. SCHUYLER, JR.
Commissioner of Patents